US007199534B2

(12) United States Patent
Ford et al.

(10) Patent No.: US 7,199,534 B2

(45) Date of Patent: Apr. 3, 2007

(54) ELECTRIC JACK STROKE LIMIT DETECTION METHOD AND DEVICE

(75) Inventors: Robert M. Ford, Troy, MI (US); John P. Manfreda, Sterling Heights, MI (US); Mark J. Woloszyk, Sterling Heights, MI (US); Shawn P. Haley, West Bloomfield, MI (US)

(73) Assignee: Innovative Design Solutions, Troy, MI (US)

( * ) Notice: Subject to any disclaimer, the term of this patent is extended or adjusted under 35 U.S.C. 154(b) by 0 days.

(21) Appl. No.: 11/223,689

(22) Filed: Sep. 9, 2005

(65) Prior Publication Data

US 2006/0081420 A1 Apr. 20, 2006

Related U.S. Application Data

(60) Provisional application No. 60/619,768, filed on Oct. 18, 2004.

(51) Int. Cl.
*H02P 1/22* (2006.01)
*B66F 7/21* (2006.01)

(52) U.S. Cl. ........................ 318/98; 318/432; 318/433; 318/436; 254/418; 254/424; 280/6.1; 280/6.153; 280/6.156

(58) Field of Classification Search ................ 318/432, 318/436, 433, 778; 280/6.156, 6.153; 254/424, 254/418

See application file for complete search history.

(56) References Cited

U.S. PATENT DOCUMENTS 3,606,247 A 9/1971 Liston
3,943,637 A 3/1976 Hanser
4,061,309 A 12/1977 Hanser
4,084,830 A * 4/1978 Daniel et al. ............... 254/424
4,148,125 A 4/1979 Hanser
4,165,861 A 8/1979 Hanser
4,380,258 A 4/1983 Hanser
4,467,250 A * 8/1984 Thomasson ................. 318/436
4,597,584 A 7/1986 Hanser
4,655,269 A 4/1987 Hanser et al.
4,743,037 A 5/1988 Hanser
4,746,133 A 5/1988 Hanser et al.
4,807,767 A * 2/1989 Kornely ...................... 212/278
5,143,386 A * 9/1992 Uriarte ....................... 254/418
5,176,391 A 1/1993 Schneider et al.
5,188,379 A 2/1993 Krause et al.
5,511,459 A 4/1996 Hanser et al.
5,547,040 A 8/1996 Hanser et al.
5,628,521 A 5/1997 Schneider et al.
5,676,385 A 10/1997 Schneider et al.
5,772,270 A 6/1998 Hanser et al.
5,890,721 A 4/1999 Schneider et al.
5,901,969 A 5/1999 Schneider et al.

(Continued)

*Primary Examiner*—Paul Ip
(74) *Attorney, Agent, or Firm*—Reising, Ethington, Barnes, Kisselle, P.C.

(57) ABSTRACT

A method and device for detecting the stroke limit of an electric motor-driven jack while the jack is being used to adjust the attitude of a mobile platform. A controller is programmed to detect when an electric jack motor has driven a jack to a jack stroke limit by monitoring one or more jack motor power draw characteristics and comparing those values to known values associated with the driving of a jack at or near the end of a jack stroke.

13 Claims, 7 Drawing Sheets

U.S. PATENT DOCUMENTS

| | | | | |
|---|---|---|---|---|
| 5,908,215 | A | 6/1999 | Hanser et al. | |
| 5,913,525 | A | 6/1999 | Schneider et al. | |
| 6,050,573 | A | 4/2000 | Kunz | |
| 6,948,722 | B2 * | 9/2005 | Sproatt et al. | 280/6.153 |
| 7,091,683 | B1 * | 8/2006 | Smith et al. | 318/432 |
| 2003/0015982 | A1 * | 1/2003 | Cox-Smith et al. | 318/433 |
| 2004/0046337 | A1 * | 3/2004 | Sproatt et al. | 280/6.156 |
| 2004/0155622 | A1 * | 8/2004 | Mayhew et al. | 318/778 |
| 2005/0237802 | A1 * | 10/2005 | Santero et al. | 365/185.11 |

* cited by examiner

ELECTRIC JACK STROKE LIMIT DETECTION METHOD AND DEVICE

CROSS-REFERENCES TO RELATED APPLICATIONS

This application claims priority from Provisional Application No. 60/619,768, filed Oct. 18, 2004 and entitled "POSITIONING DEVICE FOR MOBILE PLATFORM HAVING DC ELECTRIC JACKS".

STATEMENT REGARDING FEDERALLY SPONSORED RESEARCH OR DEVELOPMENT

Not Applicable

BACKGROUND OF THE INVENTION

1. Field of the Invention

This invention relates generally to an electric jack stroke limit detection method and device for detecting the stroke limit of an electric motor-driven jack while the jack is being used to adjust the attitude of a mobile platform.

2. Description of the Related Art Including Information Disclosed Under 37 CFR 1.97 and 1.98

There are a wide variety of commercial and industrial applications requiring mobile platforms that can be aligned relative to Earth's gravity (true level) by a known angle, or set of angles. The platforms are mobile and are often self-propelled, allowing them to be easily moved to various locations on the Earth's surface. However, once at a given location the platform must be supported and aligned relative to Earth's gravity before operating in its intended capacity. Examples of such platforms include: heavy industrial equipment, cranes, cherry pickers, and recreational vehicles.

The support and alignment of the platform is often accomplished through the use of jacks attached at different positions around the platform. The jacks may be extended to contact the ground, creating a rigid support base for the platform. By extending and retracting specific jacks, the platform may be aligned to at any angle allowed within the mechanical limits of the platform and jacks. The jacks may be hydraulically driven, or may be driven by DC electric motors.

With the advent of these platforms came the need for systems that can control jack movement (extension and retraction) and automate the task of bringing a platform to a known desired attitude. (Although, in the art, these systems are sometimes referred to as "mobile platform automatic positioning systems," this document will refer to them as mobile platform automatic attitude adjustment systems, or just "platform attitude adjustment systems" for short. This is because the word "positioning" has connotations more closely related to translation of a body through space rather than the adjustment of the attitude of a body "in-place." This document uses the word "system" to refer simultaneously to both a device and a process (or method) carried out by that device.)

Recent improvements in sensor technology, combined with the falling prices of semiconductors and microprocessors, are advancing the state-of-the-art in platform attitude adjustment systems. Where, in the past, jack movement was coordinated through the use of discrete circuitry and limited feedback, today it is known for computer processors to use new sensor technologies and advanced algorithms to adjust platform attitudes faster, safer, and more accurately than before. Today's mobile platform leveling or attitude adjustment systems are several orders of magnitude more sophisticated and powerful than their predecessors, allowing for unprecedented levels of control and reliability in their operation, but are configured to operate only hydraulically-actuated jacks.

It is beneficial for a mobile platform attitude adjustment or leveling system to include a control algorithm that takes into account jack position as well as remaining stroke length. A system using jacks to position a platform should, therefore, be able to detect when a jack has reached the maximum or minimum limits or ends of its stroke.

It is known for mobile platform leveling systems to employ DC electric jacks and for electronic controllers in such systems to detect when those jacks have reached maximum stroke limits while the jacks are being used to adjust the attitude of a mobile platform.

For example, U.S. Pat. No. 5,143,386 issued 1 Sep. 1992, to Uriarte (the Uriarte patent), discloses a mobile platform leveling system using DC electric motor-driven jacks and that is able to detect when any of those jacks reaches a maximum stroke limit. Specifically, the Uriarte patent includes a plurality of voltage comparator circuits that interface a controller to respective jack position status lines and a plurality of grounding switches, each connected in one of the voltage comparator circuits and positioned to ground that circuit when a corresponding jack is fully retracted. Without the costly addition of grounding switches, the Uriarte system would be unable to detect when jacks a jack has reached a stroke limit. The Uriarte patent also discloses current sense circuits that use Hall effect sensors sense the intensity of the magnetic flux due to the current flowing between each fuse and relay pair for each jack, which is in effect proportional to the current drawn by the motor on each jack 203. However, the controller doesn't use this proportional value to identify stroke limits.

Also, U.S. Pat. No. 4,084,830 issued 18 Apr. 1978, to Daniel, Jr. et al. (the Daniel patent), discloses a method for detecting when DC electric motor-driven jacks in a mobile platform leveling system have either fully retracted to respective inner stroke limits, or have extended to respective outer stroke limits. The Daniel patent discloses a controller connected to a plurality of upper limit switches that are supported in respective positions to detect when corresponding jacks are in respective fully retracted states. A plurality of lower limit switches are electrically connected to the controller and are supported in respective positions to detect when corresponding jacks are in respective fully extended states. The controller is programmed to interpret a signal from each of the upper limit switches as indicating full retraction of a corresponding jack and a signal from each of the lower limit switches as indicating full extension of a corresponding jack. Without the costly addition of the limit switches, the system disclosed in the Daniel patent would be unable to detect when a jack has reached a stroke limit.

What is needed is a method and device for detecting the stroke limit of an electric motor-driven jack without requiring the installation of jack position sensing devices and circuits such as grounding switches, comparator circuits, or limit switches.

BRIEF SUMMARY OF THE INVENTION

According to the invention a device is provided for detecting the stroke limit of an electric motor-driven jack while the jack is being used to adjust the attitude of a mobile platform. The device includes a controller configured to detect when an electric jack motor has driven a jack to one of a maximum and a minimum jack stroke limit by monitoring jack motor power draw and comparing jack motor power draw to known jack motor power draw values associated with the operation of an electric jack at or near the end of a jack stroke. This obviates the need for additional jack stroke position sensing devices or circuits.

According to another aspect of the invention a vehicle attitude adjustment device is provided for adjusting the attitude of a mobile platform. The device comprises a jack connectable to a platform in a position where, when extended, an extensible portion of the jack can be extended to contact the ground. The device also includes an electric motor drivingly connected to the extensible portion of the jack and a controller connected to the jack motor. The controller is configured to command the motor to extend and retract the jack and to detect when the jack motor has driven a jack to one of a maximum and a minimum jack stroke limit. The controller is configured to detect a stroke limit by monitoring and comparing jack motor power draw to known jack motor power draw values associated with the operation of an electric jack at or near the end of a jack stroke.

Also according to the invention, a method is provided for detecting the stroke limit of an electric motor-driven jack while the jack is being used to adjust the attitude of a mobile platform. According to this method one can detect the stroke limit of an electric motor-driven jack selecting a motor power draw characteristic that changes when an electric jack reaches a stroke limit, determining a range of values for that characteristic that are consistent with the reaching of a stroke limit, retrievably storing that range of values, monitoring motor power draw for the selected power draw characteristic, comparing monitored power draw values for the selected characteristic with the stored range of values for that characteristic, and recognizing that the jack has reached a stroke limit whenever the measured power draw characteristic falls within the stored range of values.

Also according to the invention, a method is provided for detecting when an electric jack motor has driven a jack to a stroke limit. The method includes selecting a motor power draw characteristic that changes when an electric jack reaches a stroke limit, determining a range of values for that characteristic that are consistent with the reaching of a stroke limit and retrievably storing that range of values. Motor power draw is then monitored for the selected power draw characteristic, monitored power draw values for the selected characteristic are then compared with the stored range of values for that characteristic and a signal is provided to a controller whenever the measured power draw characteristic falls within the stored range of values. The motor power draw characteristic may be any one or more characteristics selected from the group consisting of the magnitude of motor current draw, the slope of the power curve of the jack motor, and the jack motor power waveform pattern.

BRIEF DESCRIPTION OF THE SEVERAL VIEWS OF THE DRAWINGS

These and other features and advantages of the invention will become apparent to those skilled in the art in connection with the following detailed description and drawings, in which.

DETAILED DESCRIPTION OF INVENTION EMBODIMENT(S)

Figure 1:
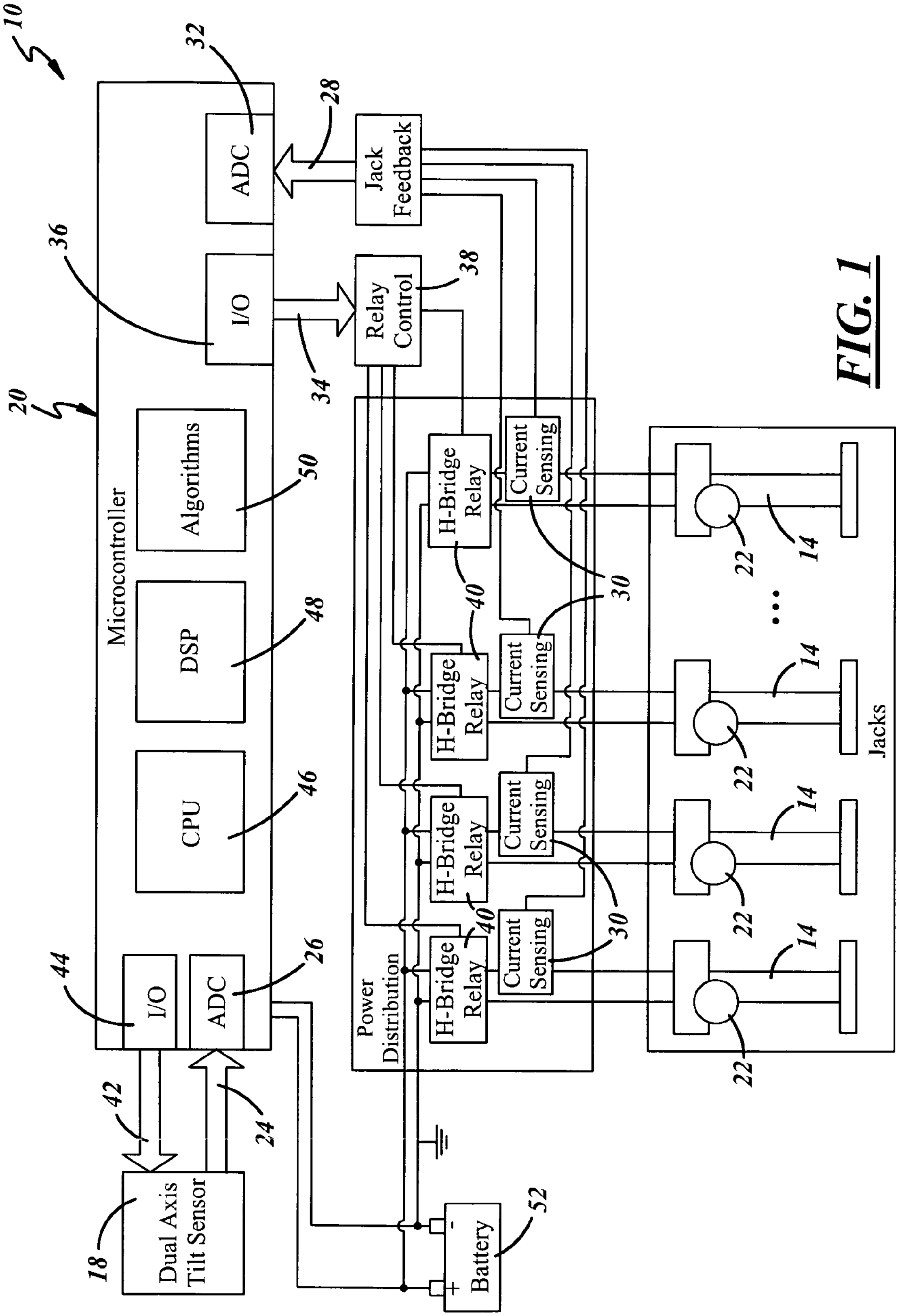
FIG. 1 is a schematic block diagram of a mobile platform attitude adjustment device constructed according to the invention.
Figure 2:
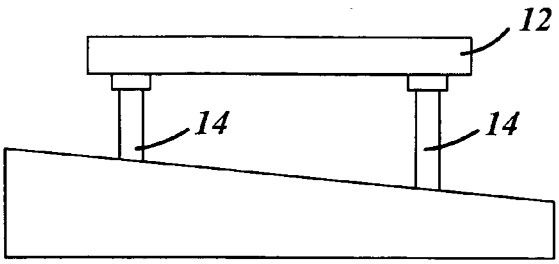
FIG. 2 is a schematic front view of a pair of jacks supporting a platform over ground.
Figure 3:
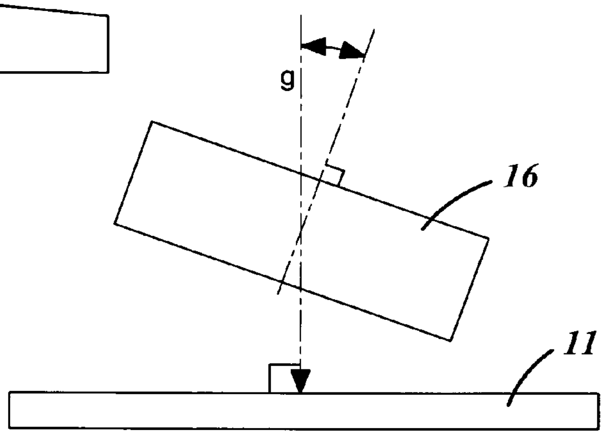
FIG. 3 is a schematic front view of a tilt sensor shown tilted relative to earth gravity.
Figure 4:
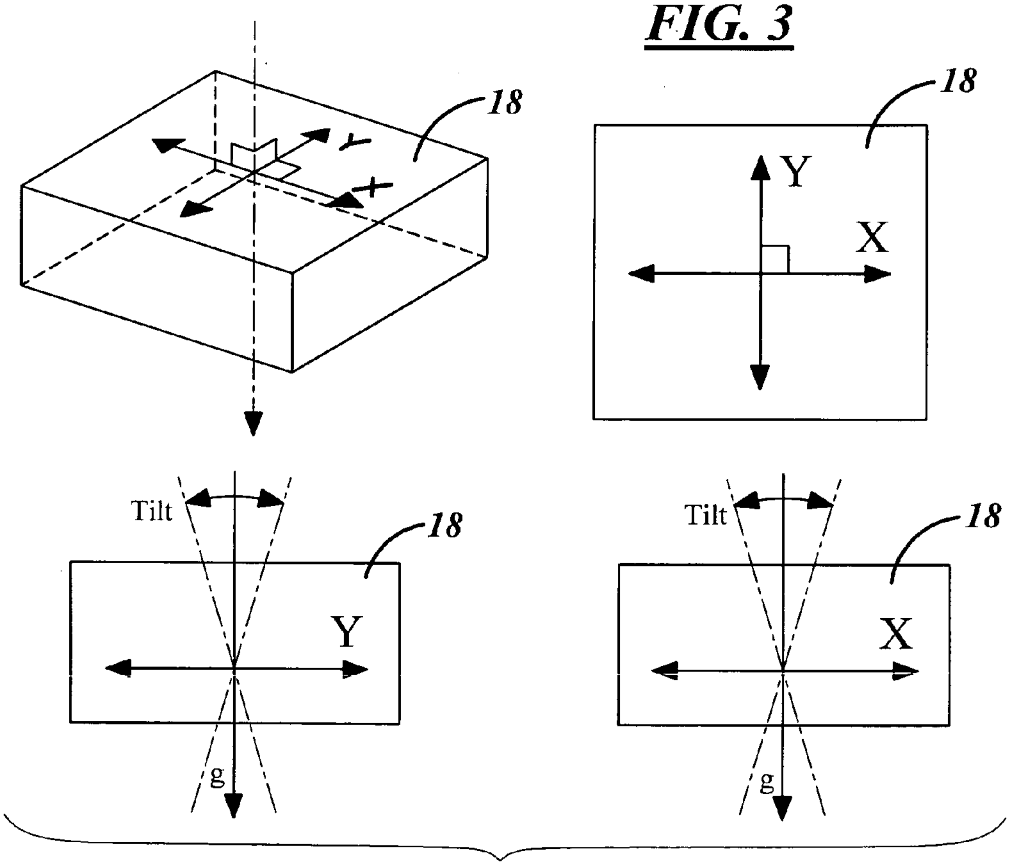
FIG. 4 includes schematic orthogonal, top, side, and front views of a dual-axis tilt sensor and coordinate axes relative to earth gravity.

In this document the term "target platform" or simply "platform" refers to a surface to be raised relative to the ground and its attitude adjusted in preparation for performing some operation or for accommodating certain activities to be carried out on a platform such as the platform shown at 12 in FIG. 2. The term "jack" refers to a mechanism for raising heavy objects by means of force applied with a lever, screw, or press. In this paper, the jacks 14 are of a type driven by motors 22 powered by direct electrical current (DC electrical power) as shown in FIGS. 1 and 2. The term "tilt sensor" refers to a sensor, such as the sensor shown at 16 in FIG. 3, that's designed to detect the angle of tilt between a vertical axis through the sensor 16 and Earth gravity. The term "dual axis tilt sensor" refers to a tilt sensor capable of detecting the angle between the sensor and the Earth's gravity in two axes, each perpendicular to the other. In FIGS. 1 and 4 a dual axis tilt sensor is shown at 18.

An electric jack stroke limit detection device is therefore provided for detecting the stroke limits of a plurality of electric motor-driven jacks 14 while the jacks 14 are being used to adjust the attitude of a mobile platform 12. The device, which is generally indicated at 10 in FIG. 1, includes a controller 20 programmed to detect when a DC electric jack motor 22 has driven a jack 14 to either one of a maximum and a minimum jack stroke limit. The controller 20 is programmed to accomplish this by monitoring and comparing the power draws of each of the jack motors 22 to known jack motor power draw characteristics associated with the operation of an electric jack 14 at or near the end of a jack stroke.

There are a number of motor power draw characteristics that are affected significantly when a jack 14 reaches a stroke limit. Once a jack 14 has reached the end or limit of a stroke, the jack mechanically cannot be moved further in the direction it was being driven, which obviously affects the electric motor 22 driving the jack 14. Depending on the construction of the jack 14 and the way the motor 22 drives the jack 14, different things may happen to the jack drive motor power draw: If the motor 22 directly drives the jack 14, the motor 22 may not be able to rotate to propel the jack 14 any further because the jack 14, having reached the end of its stroke, cannot move. In this case, the motor 22 behaves as if it is driving a load of infinite mass. The motor 22 will draw maximum current, but will not rotate or translate. If mechanical drive linkage components in and between the jack 14 and the motor 22 are generally incompressible, a sudden current and power spike results. To the degree that such mechanical linkage components are compressible, the power increase will be somewhat more gradual. If, instead of a direct-drive, a clutching mechanism connects the motor 22 to the jack 14, the clutching mechanism will allow the motor 22 to continue to rotate or translate while the jack 14 remains stationary. The clutching mechanism attempts to transfer motor torque to the jack 14 until enough spring energy has built up to trip the clutching mechanism, at which point the energy is released. The motor 22 continues to rotate while the clutch periodically triggers. In this case, the motor 22 behaves as if it were driving a spring that's continually storing and releasing energy and the jack drive motor power draw oscillates accordingly.

The electric jack stroke limit detection device 10 takes advantage of these known power draw characteristics. Specifically, the detection device controller 20 is programmed to detect when a jack 14 has reached a stroke limit by detecting a stall in a DC electric motor 22 that directly drives a jack 14, by detecting mechanical tightening in and between a DC electric jack 14 and a DC electric motor 22 that directly drives the jack, and/or by detecting clutching that occurs in a clutch connected between a DC electric jack drive motor 22 and a jack 14.

In the preferred embodiment, the stroke limit detection device controller 20 is a controller for a platform attitude adjustment device 10. In other words, stroke limit detection is a function of the platform attitude adjustment device 10 that allows the platform attitude adjustment device 10 to shut off jacks 14 when they reach their respective stroke limits during platform attitude adjustment. Details relating to the construction and operation of a platform attitude adjustment device employing such a controller can be found in U.S. Pat. No. 6,584,385, which issued 24 Jun. 2003 to Ford et al., is assigned to the assignee of the present invention, and is incorporated herein by reference.

As shown in FIG. 1, the controller 20 receives signals 24 representing platform attitude from the dual-axis tilt sensor 18 through an analog-to-digital converter 26. The controller 20 also receives feedback signals 28 from each of a plurality of jacks 14 from current sensors 30 through the analog-to-digital converter 26. While FIG. 1 shows two ADC blocks, it's understood that the device 10 may use either two analog-to-digital converters or single analog-to-digital converter including an ADC conversion circuit capable of individually converting signals from different signal sources, e.g., by internally multiplexing signals received via a plurality of channels.

The controller 20 is capable of sending control signals 34 to the jacks 14 through a first I/O port 36, a relay control 38, and respective H-bridge relays 40. The controller 20 is also capable of sending control signals 42 to the dual-axis tilt sensor 18 through a second I/O port 44. The controller 20 includes a central processing unit 46, a software-implemented digital signal processor 48, and control algorithms 50. A battery 52 provides electrical power to the jacks 14 through the H-bridge relays 40 as well as to the controller 20.

In practice, the point at which a DC electric jack motor 22 has driven a jack 14 to either a maximum or a minimum stroke limit can be detected by first selecting one or more motor power draw characteristics that change when a DC electric motor-powered jack 14 reaches a stroke limit, and then determining a parameter set comprising a range of values for each selected characteristic that's consistent with the reaching of a stroke limit, and retrievably storing that range of values in the controller 20. The controller 20 is then programmed to monitor motor power draw for the selected power draw characteristic and to compare the monitored power draw values for the selected characteristic with the stored range of values for that characteristic. The controller 20 is programmed to recognize that the jack 14 has reached a stroke limit whenever the measured power draw characteristic falls within the stored range of values.

Figure 11:
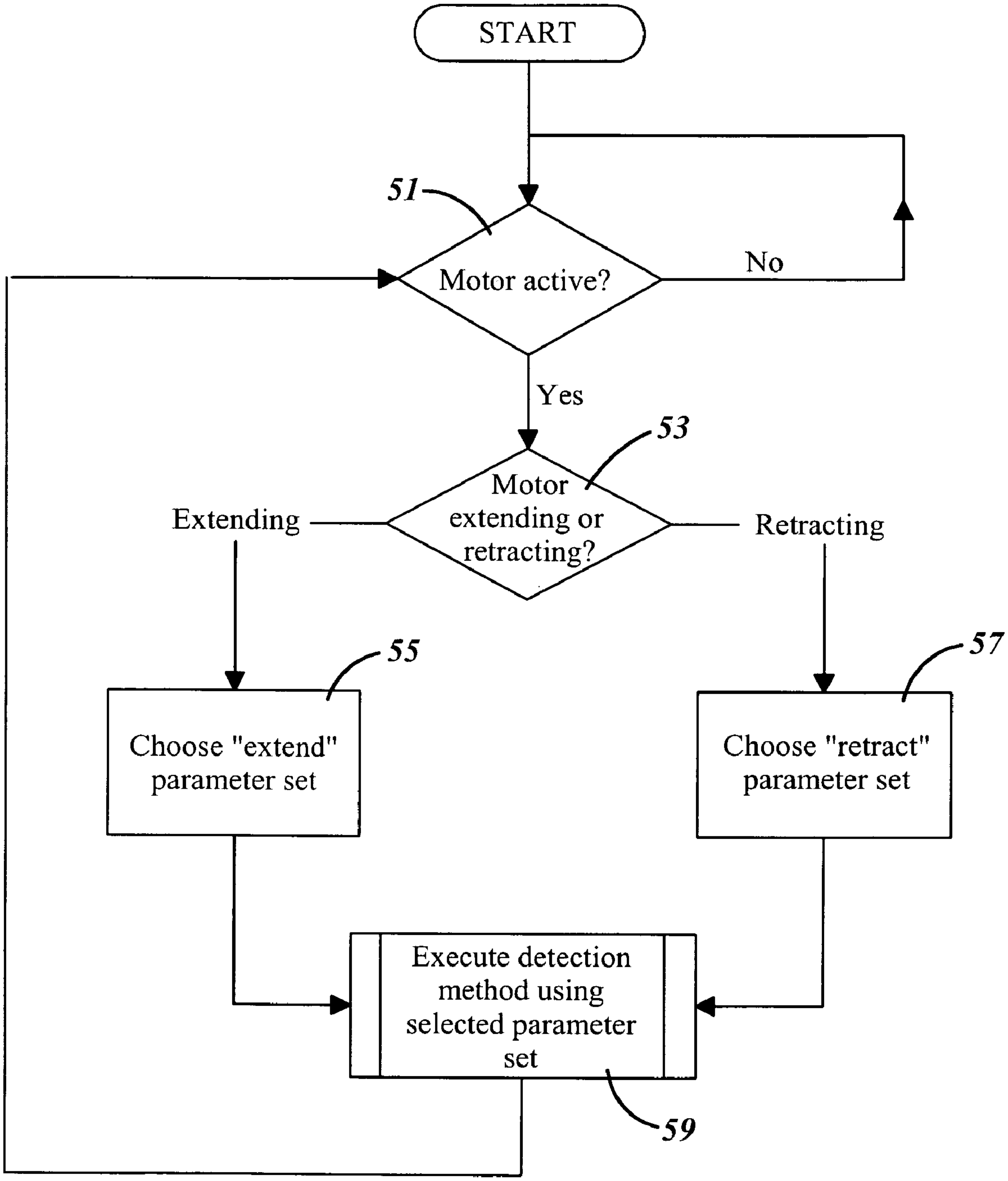
FIG. 11 is a flow chart showing an alternative method that may be implemented by the platform attitude adjustment device of FIG. 1 for determining whether the controller should use an "extend" parameter set or a "retract" parameter set to detecting when a jack has reached a jack stroke limit.

Alternatively, a first parameter set may be determined that comprises a range of values consistent with reaching a stroke extension limit and a second parameter set comprising a range of values consistent with reaching a stroke retraction limit. Both the first and second parameter sets are retrievably stored in the controller 20. As shown in FIG. 11, the controller first determines whether the motor is active as shown at decision point 51. If it is, then, as shown at decision point 53, the controller determines whether the motor is extending or retracting the jack. As shown at action point 55, the controller selects the first or "extend" parameter set if the motor is extending the jack and, as shown at action point 57, the controller selects the second or "retract" parameter set if the motor is retracting the jack. As shown at action point 59, the controller 20 then executes a selected detection method, comparing monitored power draw values for the characteristic to the "extend" parameter set if the motor 22 is extending the jack 14 and to the "retract" parameter set if the motor 22 is retracting the jack 14. When the jack 14 is extending the controller 20 recognizes the jack 14 as having reached a stroke extension limit whenever the measured power draw characteristic falls within the stored range of values of the first parameter set. When the jack 14 is retracting the controller 20 recognizes the jack 14 as having reached a stroke retraction limit whenever the measured power draw characteristic falls within the stored range of values of the second parameter set.

If the magnitude of motor current draw is selected as a motor power draw characteristic, a range of electric jack motor current draw magnitude values is determined that's consistent with the reaching of a jack stroke limit, and that range of values is retrievably stored in the controller 20. The controller 20 is programmed to employ a stroke limit detection process that, as described in detail below, includes monitoring motor current draw for increases in the magnitude of electric jack motor current draw, and comparing monitored current draw magnitude values with the stored range of current draw magnitude values. The controller 20 is programmed to recognize that a jack 14 has reached a stroke limit whenever the monitored current draw magnitude characteristic for that jack 14 falls within the stored range of current draw magnitude values.

The magnitude of motor current draw is selected as a motor power draw characteristic for applications in which jacks 14 are directly-driven by a DC electric motor 22, i.e., a motor that cannot move further once the jack 14 it is directly connected to reaches a maximum or minimum stroke limit. When a jack 14 in such a direct-drive system reaches an end of its stroke or stroke limit, a motor 22 driving the jack 14 will no longer be able to rotate in the direction it was moving while driving the jack 14 toward that limit. Because no amount of torque will cause the motor 22 to rotate, the motor 22 behaves as if it were driving a load of infinite mass. This condition is known in the art as a motor stall. When the motor 22 has stalled, it will attempt to overcome the stall by creating more and more torque. This causes the motor 22 to increase its power draw until the stall is overcome or no more power is available.

For any electrical circuit, power (P) is a function of drive voltage (V) and current (I). More specifically, electrical power is the product of drive voltage and current ($P=V\times I$).

With DC electric motors 22, the drive voltage (V) is constant. Therefore, the power draw of the motor 22 is proportional to the current draw of the motor 22. To measure the power of a motor driven by a known DC voltage, one must simply measure the motor current draw.

Figure 5:
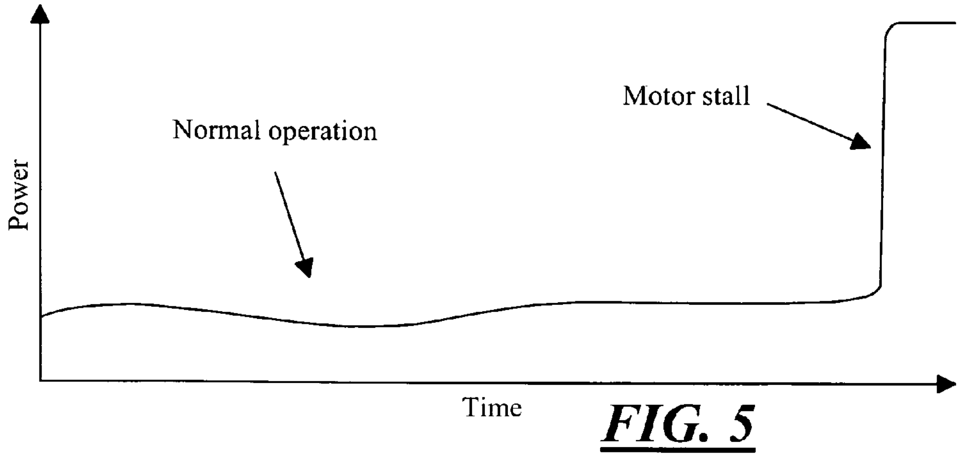
FIG. 5 is a graph depicting the power draw curve of a direct-drive DC electric motor over time and leading into a motor stall.

As shown in the graph in FIG. 5, when a DC electric motor stalls, it attempts to generate additional torque to overcome the stall. This results in a corresponding rise in current draw. Because the motor 22 cannot generate an infinite amount of torque, the motor field in the coil collapses, and the motor 22 will draw the maximum amount of current that the system can handle. Because the motor 22 is not moving, all the power is converted into heat. For this reason, a motor 22 should not be allowed to stall for a long period of time, because the generated heat could damage the motor 22.

The controller 20, as it monitors the current draw of a motor 22, will notice a large spike in current draw the moment that the stall is encountered. The controller 20 is programmed to discern a significant difference between current spikes that occur during "normal" jack travel, and the spikes that occur when a motor 22 stalls at the end of the jack stroke. Empirical measurements can be made to quantify these differences for any given set of jacks 14.

When, according to this first jack stroke limit detection process the controller 20 is using the magnitude of motor current draw as a motor power draw characteristic, the following parameters must first be empirically measured:

Motor current in-rush time ($T_{in\text{-}rush}$): Motor in-rush is a phenomenon that occurs immediately after motor actuation while coils of a DC electric motor 22 are energizing. The motor current in-rush period, which is the period between motor actuation time and motor current in-rush time, is characterized by an extremely large spike in current draw.

Motor current in-rush period should be measured over a suitably large sample of motors 22 to be used in the target application. The parameter should be set larger than the worst case in-rush time measured, to account for motors 22 outside the sample pool.

Power draw of the motor 22 during stall ($P_{stall}$).

This parameter should be measured over a suitably large sample of motors 22 to be used in the target application. The parameter should be set smaller than the lowest amount of stall power consumed to account for motors 22 outside the sample pool.

Stall debounce period ($T_{stall}$): This value represents the length of time that the motor must draw power at the $P_{stall}$ rate before concluding that a stall condition exists.

This parameter is used to prevent false detections of motor stall. Brief spikes in power draw are allowed, but will be ignored if they are shorter than this time period. The parameter should be set taking into account behavior of the target motor 22 over a wide variety of voltages and loads.

Figure 6:
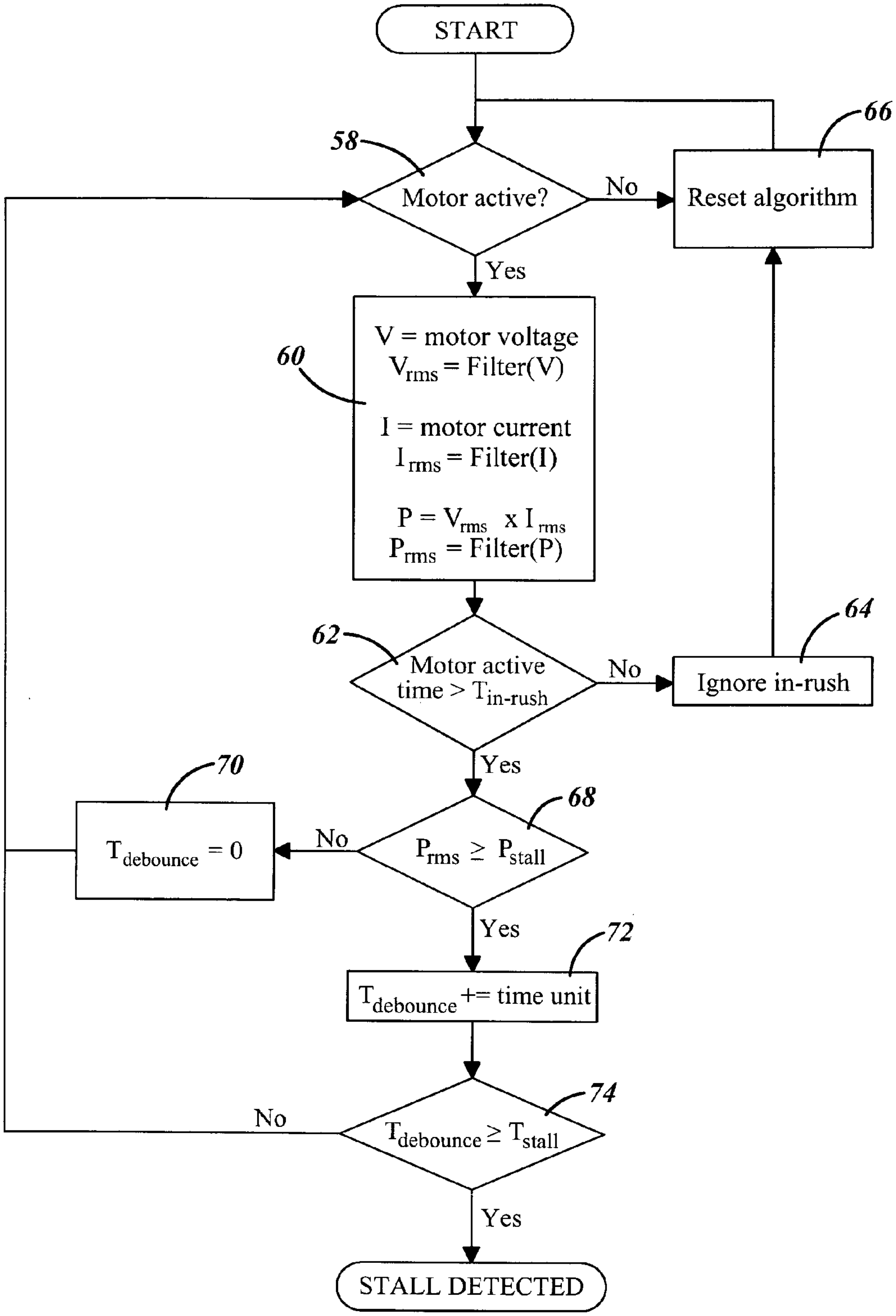
FIG. 6 is a flow chart showing a method implemented by the platform attitude adjustment device of FIG. 1, for detecting a jack stroke limit by detecting motor stall.

Referring to the flowchart of FIG. 6, the controller 20 detects DC motor stall by first determining whether the motor 22 is active as shown at decision point 58, then measuring and monitoring the DC voltage V driving the electric motor 22 as shown at action point 60. As is also shown at action point 60, the controller 20 filters the voltage into a stable RMS value ($V_{rms}$=Filter(V) or $V_{rms}$=RMS(V)) and has a cutoff frequency set appropriately for the application. The controller 20 also measures the current draw I of the electric motor 22, filters the current measurement into a stable RMS value, and has a cutoff frequency set appropriately for the application ($I_{rms}$=Filter(I) or $I_{rms}$=RMS(I)). The controller 20 calculates the power draw of the motor 22 according to the equation $P=V_{rms}\times I_{rms}$ and also filters the calculated power draw into a stable RMS value ($P_{rms}$=Filter (P) or $P_{rms}$=RMS(P)) with a cutoff frequency set appropriately for the application. The controller 20 is programmed to recognize the motor in-rush period (where such a spike is expected) as being the time period where motor actuation time is less than the motor current in-rush time ($T_{actuation}<T_{in\text{-}rush}$) as shown at decision point 62. During this period the controller 20 ignores the measured power as shown at action point 64, resets measured RMS power accordingly as shown at action point 66, and aborts the remainder of the detection method until the in-rush period is over.

For debounce, the controller 20 includes a software confirmation timer configured to record the time that a given condition is present. If the controller 20 detects a power spike that the controller 20 recognizes as being less than the power level associated with an end-of-stroke jack motor stall ($P_{rms}<P_{stall}$) as shown at decision point 68, the controller 20 resets a confirmation timer value $T_{debounce}$ of the confirmation timer to zero as shown at action point 70. If the controller 20 detects that $P_{rms}>P_{stall}$ at decision point 68, then at action point 72 the controller 20 increments the confirmation timer value $T_{debounce}$ by an appropriate time unit, e.g., the time period that has elapsed since the last measurement. If the controller 20 then determines that $T_{debounce}>T_{stall}$ at decision point 74 then the controller 20 knows that it has detected a stall and the jack 14 has reached an end of stroke or stroke limit.

The controller 20 is configured to selectably use either a single set of parameters ($T_{in\text{-}rush}$, $P_{stall}$ and $T_{stall}$) to detect either an extension limit reached during jack extension or a retraction limit reached during jack retraction, or to use two different sets of parameters to detect an extension limit and a retraction limit, respectively, as described above and shown in FIG. 11. This gives the implementer or user the flexibility to customize method behavior in each direction, according to the specific characteristics of the jack 14 in a target application.

If the slope of the power curve of the jack motor 22 is selected as a motor power draw characteristic, a range of values for the slope of the jack motor power curve is determined that's consistent with a phenomenon known as "mechanical tightening" that occurs when a jack 14 reaches a jack stroke limit, and that range of values is retrievably stored. The controller 20 is programmed to employ a jack stroke limit detection process that, as is described in detail below, includes calculating and monitoring the slope of the power curve of the motor 22 and comparing the calculated slope to the stored slope values associated with mechanical tightening. The controller 20 is programmed to recognize that the jack 14 has reached a stroke limit whenever the monitored power curve slope falls within the stored range of power curve slope values.

An ideal motor-powered jack 14 is able to extend or retract more or less freely until it reaches the end of its extension or retraction stroke, at which time all movement ceases. The ideal motor stall occurs instantaneously. However, due to mechanical components such as gears and mechanical linkages in and between a real-world jack 14 and its driving motor 22, the stall event actually occurs over a small period of time. The tolerances of these components allow for slight movements, even after a jack 14 has hit the end of its stroke. The cumulative effect of these tolerances is to allow a motor 22 to continue to rotate by a slight amount after a jack 14 has hit its end of stroke.

Mechanical tightening, then, is the forcing together of mechanical components such as gearing and mechanical linkages, within their tolerances, as torque forces accumulate during the period of time when a jack 14 has reached the end of a stroke but the motor 22 driving the jack 14 continues to rotate or translate. This document will refer to this time period as the tightening period of the system. The motor 22 will continue to rotate until the system is fully tight, meaning that the mechanical components can no longer be moved at max motor torque. At this point a true motor stall begins.

Figure 7:
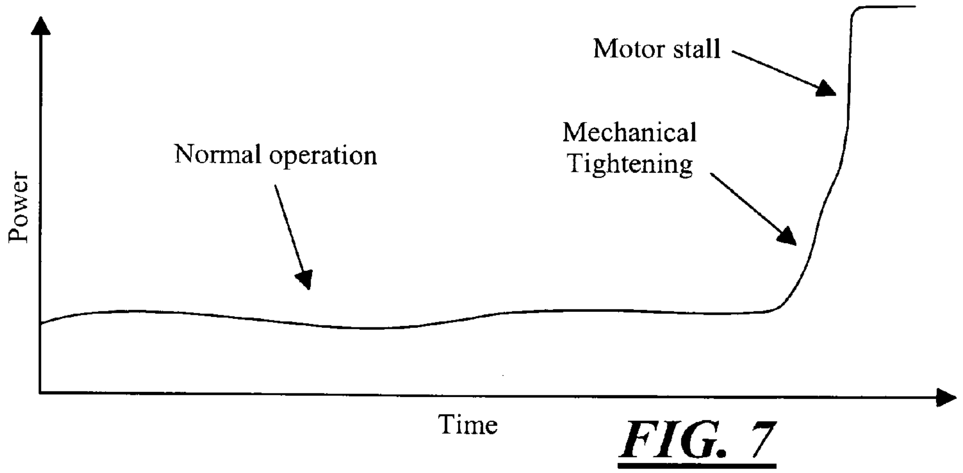
FIG. 7 is a graph depicting the power draw curve of a direct-drive DC electric motor over time, leading into a motor stall, and including a period of mechanical tightening preceding the stall.

A significant amount of torque must be used during the tightening period to force the mechanical components together. The power consumed during tightening is typically less than the normal stall power draw, but is considerably greater than the amount of power consumed for extending or retracting a jack 14 between stroke limits. A controller 20 monitoring the power profile of the motor 22 would encounter something like the image shown in FIG. 7, including a significant increase in power draw just before the motor mechanism completely stalls.

According to this second jack stroke limit detection process the controller 20 detects the mechanical tightening period by comparing the slope of the power curve to empirically measured values. The ratio of a tightening power curve to a normal power curve is less than the ratio of the slope of a tightening power curve to the slope of a normal power curve. Put another way:

$$\frac{P_{tightening}}{P_{normal}} < \frac{dP_{tightening}/dt}{dP_{normal}/dt}$$

In other words, a method of detecting tightening that relies on the slope of motor power is less susceptible to noise than a method relying on the motor power.

The following parameters must be empirically measured before implementing the second stroke limit detection process:

Motor current in-rush time ($T_{in\text{-}rush}$): Motor in-rush is a phenomenon that occurs immediately after motor actuation while coils of a DC electric motor 22 are energizing. A motor current in-rush period, which is the period between motor actuation time and motor current in-rush time, is characterized by an extremely large spike in current draw.

Motor current in-rush time should be measured over a suitably large sample of motors 22 to be used in the target application ($\Delta P_{thightening}$): The parameter should be set larger than the worst case in-rush time measured, to account for motors 22 outside the sample pool.

Rate of change of the power draw of the motor 22 during the mechanical tightening period. The slope of the tightening curve.

This parameter should be measured over a suitably large sample of motors 22 to be used in the target application. The parameter should be set slightly lower than smallest power slope detected, to account for motors 22 outside the sample pool. The parameter should be larger than typical power slopes seen outside of the in-rush period.

Tightening debounce period ($T_{tightening}$): This value represents the amount of time that the derivative of power must exceed $\Delta P_{tightening}$ before concluding that a stall condition exists.

This parameter is used to prevent false detections of motor stall. The idea is that brief spikes in power draw are allowed, but will be ignored if they are shorter than this time period. The parameter should be set taking into account behavior of the target motor 22 over a wide variety of voltages and loads.

Figure 8:
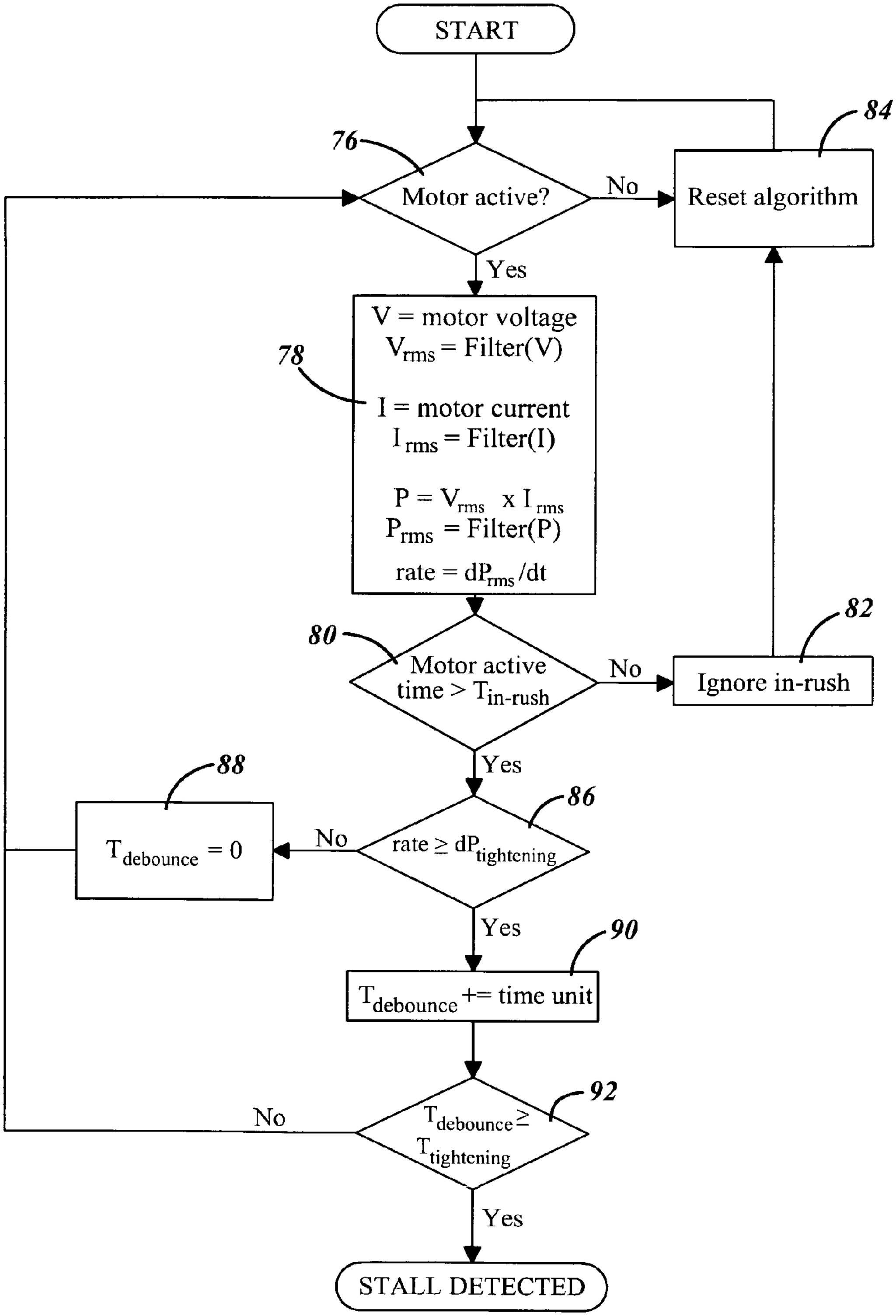
FIG. 8 is a flow chart showing a method implemented by the platform attitude adjustment device of FIG. 1, for detecting a jack stroke limit by detecting mechanical tightening preceding a motor stall.

According to the second stroke limit detection process, and as shown in the flowchart of FIG. 8, the controller 20 detects mechanical tightening by first determining whether the motor 22 is active as shown at decision point 76, then, at action point 78, measuring the DC voltage (V) driving the electric motor 22. Also at action point 78 the controller 20 filters the voltage measurement into a stable RMS value ($V_{rms}$=Filter(V) or $V_{rms}$=RMS(V)) and has a cutoff frequency set appropriately for the application. The controller 20 then measures the current draw (I) of the electric motor 22 and filters the current draw measurement into a stable RMS value ($I_{rms}$=Filter(I) or $I_{rms}$=RMS(I)) using a cutoff frequency set appropriately for the application. The controller 20 calculates the power draw of the motor 22 according to the equation $P=V_{rms}\times I_{rms}$ and filters the calculated power into a stable RMS value ($P_{rms}$=Filter(P) or $P_{rms}$=RMS(P)) using a cutoff frequency set appropriately for the application. As is also shown at decision point 78, the controller 20 calculates the rate of increase of the power draw as being the derivative of the RMS power relative to time $$\left(\text{rate} = \frac{dP_{rms}}{dt}\right)$$

and may optionally filter this value if the digital derivative is not sufficiently stable. The characteristics of this filtering function depend on system performance parameters such as the sampling speed, physical parameters of the power circuit, and quantization noise of the analog-to-digital converter.

The controller 20 is programmed to ignore any power spike generated during the motor in-rush period. If motor actuation time is less than the in-rush time ($T_{actuation}<T_{in\text{-}rush}$) at decision point 80, the controller 20 considers the motor 22 to be in the in-rush period and expects a corresponding power spike. The controller 20 is programmed to ignore the measured power during this period as shown at action point 82, to reset measured RMS power accordingly as shown at action point 84, and to abort the remainder of the detection process until the in-rush period has ended. After the in-rush period is over, and as shown at decision point 86, the controller 20 monitors motor power draw for an end-of-stroke power spike associated with mechanical tightening. The controller 20 does this by resetting the confirmation timer value ($T_{debounce}$) to zero at action point 88 if the power draw increase rate is less than the power draw change rate during the mechanical tightening period rate<$\Delta P_{tightening}$. If the power draw increase rate is greater than the power draw change rate during the mechanical tightening period rate>$\Delta P_{tightening}$, the confirmation timer value $T_{debounce}$ is incremented by the appropriate time unit at action point 90. If the confirmation timer value is greater than the mechanical tightening period $T_{debounce}>T_{tightening}$ at decision point 92, then the controller 20 perceives that the motor 22 has stalled and that the jack 14 has reached the end of a stroke.

As with the first jack stroke limit detection process, the second jack stroke limit detection process is not concerned with the direction of travel of the jack 14. Thus, a given implementation may compel the choice of a single set of parameters for both extension and retraction, or, as described above and shown in FIG. 11, two independent sets of parameters, one for use when extending the jack 14 toward its extension limit and the other for use when retracting the jack 14 towards its retraction limit.

If the jack motor power waveform pattern is selected as a motor power draw characteristic, a range of power waveform patterns is determined that's consistent with clutching that occurs when reaching a jack stroke limit, and that range of clutching wave pattern values retrievably stored, i.e, clutching wave patterns. The controller 20 is programmed to implement a third jack stroke limit detection process that, as described in detail below, includes monitoring the jack motor power waveform and processing that waveform to detect a wave pattern. The controller 20 is further programmed to compare the monitored jack motor power wave patterns with the stored range of clutching wave patterns associated with motor clutching. The controller 20 is programmed to recognize that the jack 14 has reached a stroke limit whenever the monitored jack motor power wave patterns falls within the stored range of clutching wave patterns.

The controller 20 is programmed to implement the third jack stroke limit detection process, in applications where the controller 20 must detect extension and retraction limits of a DC electric motor driven jack 14 through a clutching system that allows the motor 22 to continue spinning or translating after the jack 14 has reached a stroke limit. The controller 20 accomplishes this by, as indicated above, by identifying jack motor power waveform patterns that are consistent with clutching. More specifically, the controller 20 identifies such waveform patterns by measuring rate of motor load change.

When a DC direct drive motor 22 stalls, a large amount of torque and heat are generated. Over time, these forces will wear the jack 14, reducing its effective lifespan. Because of this, many jack manufacturers have implemented motor clutching systems that allow a motor 22 to continue to spin even after the jack 14 has reached a stroke limit.

A clutching system of this type is designed to transfer motor torque to a jack 14. If the jack 14 refuses to move, the clutch stores the energy like a spring. In this way, the motor 22 may continue to spin at a fairly constant rate, and any excess energy is stored in the clutch and applied to the jack 14.

To prevent overload, clutches of this type are designed to trip and release energy when the energy level increases to a predetermined value. The clutch releases this accumulated energy in much the same way as a loaded spring whose load has been released.

When a jack 14 that includes a clutch encounters an end of travel or stroke limit, its motor 22 continues to spin, but the energy that the motor 22 produces, being unable to move the jack 14, instead builds up in the clutch. After a period of time, the clutch will trigger, release the energy, and the process will begin again. With regard to motor load, the motor 22 behaves as if it were driving a spring that's continually storing and releasing energy.

Figure 9:
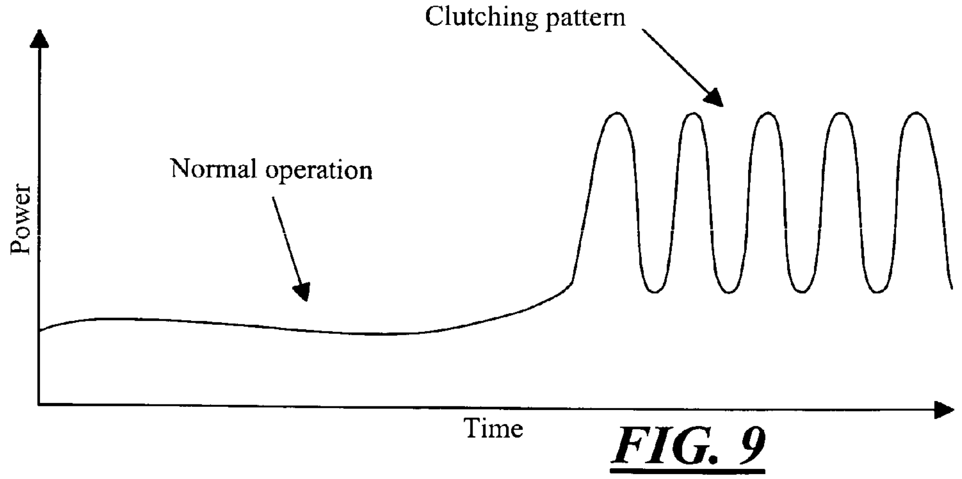
FIG. 9 is a graph depicting the power draw curve of a clutched DC electric motor over time, leading into a period of clutching from a period of normal jack operation.

As shown in FIG. 9, the continuous series of clutching periods appears as a regular, periodic waveform. This waveform may take on either a sinusoidal or a triangular wave shape, depending largely on the specific design of the motor 22 and clutch mechanism.

The amplitude of the clutching pattern is significant, because clutch systems for transferring torque from an electric motor 22 to a jack 14 are designed to store a comparatively large amount of energy—enough energy to help the jack 14 overcome brief periods of sticking and/or loading.

According to the third jack stroke limit detection process, to detect a clutching pattern, the controller 20 processes the power waveform by measuring the dynamic power draw of the motor 22, high-passing or band-passing the power draw signal to isolate the band clutching frequencies, then calculating the energy distribution in these frequencies to determine if a clutch condition exists.

The third jack stroke limit detection process requires that the following parameters be empirically measured:

Motor current in-rush time ($T_{in\text{-}rush}$): Motor in-rush is a phenomenon that occurs immediately after motor actuation while coils of a DC electric motor 22 are energizing. Motor current in-rush period, the period between motor actuation time and motor current in-rush time, is characterized by an extremely large spike in current draw.

Motor current in-rush time should be measured over a suitably large sample of motors 22 to be used in the target application. The parameter should be set larger than the worst case in-rush time measured, to account for motors 22 outside the sample pool.

High and low frequencies for the clutch waveform band pass filter ($Freq_{clutch\text{-}hi}$) ($Freq_{clutch\text{-}lo}$) These two parameters specify the range of frequencies that the clutching mechanism operates within.

The clutch frequency range should be measured over a suitably large sample of motors 22 to be used in the target application. The range should be set slightly wider than the sample pool, to account for motors 22 outside the pool.

Low end measurement of RMS power draw in the clutching frequency range (measured while the motor 22 is clutching) ($P_{clutch}$).

After the clutch frequency range has been determined, the energy in that range should be measured over a suitably large sample of motors 22 to be used in the target application. This parameter should be set at the low end of the RMS power values measured. The parameter should be set slightly smaller than the worst case measured value, to account for motors 22 outside the sample poll.

Clutch signal confirmation debounce period ($T_{clutch}$): This value represents the amount of time that $P_{clutch}$ energy must exist in the $Freq_{clutch\text{-}lo}$ to $Freq_{clutch\text{-}hi}$ bands before concluding that a clutching condition exists.

This parameter is used to prevent false detections of the clutching signal, caused by brief spikes of energy in the pass bands. Such spikes will pass unnoticed if they are shorter than this time period. The parameter should be set taking into account behavior of the target motor 22 over a wide variety of voltages and loads.

Figure 10:
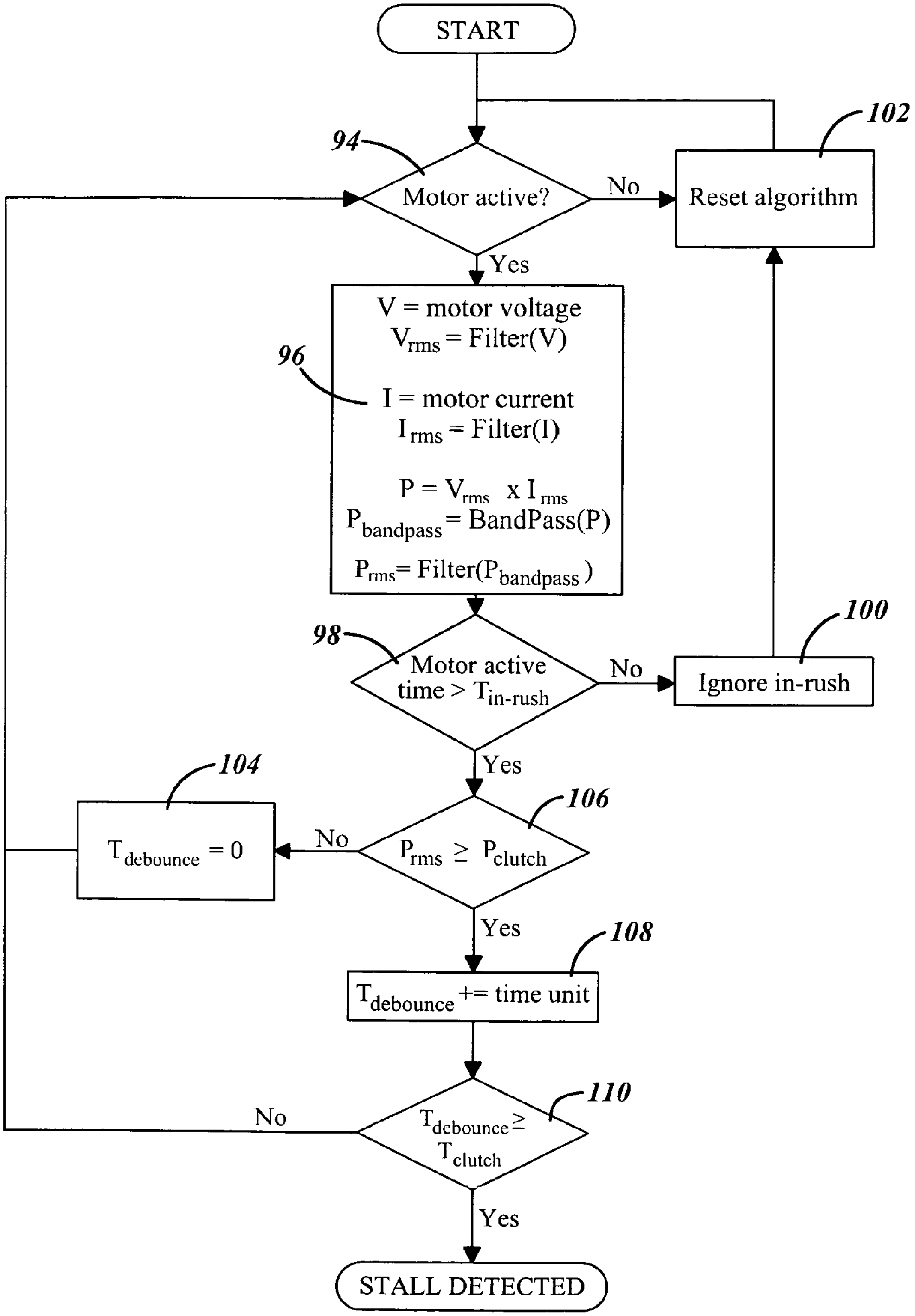
FIG. 10 is a flow chart showing a method implemented by the platform attitude adjustment device of FIG. 1, for detecting a jack stroke limit by detecting clutching.

According to the third jack stroke limit detection process, and as shown in FIG. 10, the controller 20 first determines whether the motor 22 is active at decision point 94, then, at action point 96 measures the DC voltage V driving the electric motor 22. The controller includes a voltage filter that, also at action point 96, filters the voltage into a stable RMS value ($V_{rms}$=Filter(V) or $V_{rms}$=RMS(V)), the filter having a cutoff frequency set appropriately for the application. Also at action point 96, the controller 20 measures the current draw (I) of the electric motor 22 and filters the current draw into a stable RMS value ($I_{rms}$=Filter(I) or $I_{rms}$=RMS(I)), using a cutoff frequency set appropriately for the application. The controller 20 calculates the power draw of the motor 22 according to the equation $P=V_{rms}\times I_{rms}$. The calculated power is run through a band-pass filter with upper and lower frequencies set to $Freq_{clutch\text{-}hi}$ and $Freq_{clutch\text{-}in}$, to arrive at a filtered power value ($P_{bandpass}$=BandPass(P)). Again at decision point 96, the controller 20 filters the band pass power into a stable RMS value ($P_{rms}$=Filter($P_{bandpass}$) or $P_{rms}$=RMS($P_{bandpass}$)) using a cutoff frequency set appropriately for the application. The controller 20 is programmed to disregard any power spike generated during motor in-rush by ignoring measured power and resetting associated RMS measurements when motor actuation time is less than the pre-determined in-rush time, i.e., when $T_{actuation}<T_{in\text{-}rush}$ as shown at decision point 98 and action points 100 and 102, and to abort the remainder of the detection process until the in-rush period is over. The controller 20 is programmed to detect and respond to a power spike associated with clutching that occurs when the jack 14 reaches an end of stroke. The controller 20 is programmed to accomplish this by resetting a confirmation timer value ($T_{debounce}$) to zero at action point 104 if $P_{rms}<P_{clutch}$ at decision step 106, incrementing the confirmation timer value ($T_{debounce}$) by the appropriate time unit at action point 108 if $P_{rms}>P_{clutch}$, and registering clutching detection if $P_{rms}>P_{clutch}$ at decision step 106 and $T_{debounce}>T_{cluch}$ at decision step 110.

As with the first and second jack stroke limit detection processes, the third process is not concerned with the direction of travel of the jack 14. Thus, a given implementation may choose to use a single set of parameters for both extension and retraction, or, as shown in FIG. 11, two independent sets of parameters, one for use when extending the jack 14 toward its extension limit and the other for use when retracting the jack 14 towards its retraction limit.

This description is intended to illustrate certain embodiments of the invention rather than to limit the invention. Therefore, it uses descriptive rather than limiting words.

Obviously, it's possible to modify this invention from what the description teaches. Within the scope of the claims, one may practice the invention other than as described.

What is claimed is:

1. An electric jack stroke limit detection device for detecting the stroke limit of an electric motor-driven jack while the jack is being used to adjust the attitude of a mobile platform; the device comprising:

a controller configured to detect when an electric jack motor has driven a jack to one of a maximum and a minimum jack stroke limit by monitoring and comparing jack motor power draw to known jack motor power draw values associated with the operation of an electric jack at or near a jack stroke limit; and a jack motor power draw sensor connected to the controller and configured to sense electrical power drawn by a jack motor and to transmit a corresponding jack motor power draw feedback signal to the controller.

2. An electric jack stroke limit detection device as defined in claim 1 in which the controller is configured to detect when a jack has reached a stroke limit by detecting a stall in an electric motor driving the jack.

3. An electric jack stroke limit detection device as defined in claim 1 in which the controller is configured to detect when a jack has reached a stroke limit by detecting mechanical tightening in the jack.

4. An electric jack stroke limit detection device as defined in claim 1 in which the controller is configured to detect when a jack has reached a stroke limit by detecting clutching in a clutch connected between a jack drive motor and the jack.

5. An electric jack stroke limit detection device as defined in claim 1 in which the controller is configured to detect when a jack has reached a stroke limit by detecting any one or more phenomena selected from the group consisting of: electric jack motor stall, mechanical tightening in the jack, and clutching in a clutch connected between a jack drive motor and the jack.

6. A vehicle attitude adjustment device for adjusting the attitude of a mobile platform; the device comprising:

a jack connectable to a platform in a position where, when extended, an extensible portion of the jack can be extended to contact the ground;

an electric motor drivingly connected to the extensible portion of the jack; and a controller connected to the jack motor and configured to command the motor to extend and retract the jack and to detect when the jack motor has driven a jack to one of a maximum and a minimum jack stroke limit, the controller being configured to detect a stroke limit by monitoring and comparing jack motor power draw to known jack motor power draw values associated with the operation of an electric jack at or near the end of a jack stroke.

7. A method for detecting when an electric jack motor has driven a jack to a stroke limit, the method including the steps of:

selecting a motor power draw characteristic that changes when an electric jack reaches a stroke limit;

determining a range of values for that characteristic that are consistent with the reaching of a stroke limit;

retrievably storing that range of values; monitoring motor power draw for the selected power draw characteristic;

comparing monitored power draw values for the selected characteristic with the stored range of values for that characteristic; and recognizing that the jack has reached a stroke limit whenever the measured power draw characteristic falls within the stored range of values.

8. The method of claim 7 in which:

the step of determining a range of values includes determining a first range of values that are consistent with reaching a stroke extension limit and a second range of values consistent with reaching a stroke retraction limit;

the step of retrievably storing includes retrievably storing both the first and second ranges of values;

the step of comparing monitored power draw values includes comparing monitored power draw values for the characteristic with both the first and the second stored ranges of values; and the step of recognizing a stroke limit includes;

recognizing that the jack has reached a stroke extension limit whenever the measured power draw characteristic falls within the first stored range of values; and recognizing that the jack has reached a stroke retraction limit whenever the measured power draw characteristic falls within the second stored range of value.

9. The method of claim 7 in which:

the step of selecting a motor power draw characteristic includes selecting as a motor power draw characteristic the magnitude of motor current draw;

the step of determining a range of values includes determining a range of values for the magnitude of electric jack motor current draw that are consistent with the reaching of a jack stroke limit;

the step of retrievably storing includes retrievably storing the determined range of motor current draw values;

the step of monitoring motor current draw includes monitoring motor current draw for increases in power magnitude;

the step of comparing monitored current draw values includes comparing monitored current draw magnitude values with the stored range of current draw magnitude values; and the step of recognizing that the jack has reached a stroke limit includes recognizing that the jack has reached a stroke limit whenever the monitored current draw magnitude falls within the stored range of current draw magnitude values.

10. The method of claim 7 in which:

the step of selecting a motor power draw characteristic includes selecting as a motor power draw characteristic the slope of the power curve of the jack motor;

the step of determining a range of values includes determining a range of values for the slope of the jack motor power curve that are consistent with mechanical tightening that occurs when reaching a jack stroke limit;

the step of retrievably storing includes retrievably storing the determined range of motor power curve slope values; the step of monitoring motor power draw includes calculating and monitoring the slope of the power curve of the motor;

the step of comparing monitored power draw values includes comparing monitored power curve slope values to the stored slope values associated with mechanical tightening; and the step of recognizing that the jack has reached a stroke limit includes recognizing that the jack has reached a stroke limit whenever the monitored power curve slope falls within the stored range of power curve slope values.

11. The method of claim 7 in which:

the step of selecting a motor power draw characteristic includes selecting as a motor power draw characteristic the jack motor power waveform pattern;

the step of determining a range of values includes determining a range of power waveform patterns that are consistent with clutching that occurs when reaching a jack stroke limit;

the step of retrievably storing includes retrievably storing the determined range of power waveform patterns;

the step of monitoring motor power draw for the selected power draw characteristic includes monitoring and processing the jack motor power waveform to detect a power wave pattern;

the step of comparing monitored power draw values includes comparing monitored jack motor power wave patterns with the stored range of clutching wave patterns associated with motor clutching; and the step of recognizing that the jack has reached a stroke limit includes recognizing that the jack has reached a stroke limit whenever the monitored jack motor power wave pattern falls within the stored range of clutching wave patterns.

12. The method of claim 11 in which the step of processing the jack motor power waveform includes:

measuring the dynamic power draw of the motor;

filtering the power draw signal to isolate the band clutching frequencies; and calculating the energy distribution in these frequencies.

13. A method for detecting when an electric jack motor has driven a jack to a stroke limit, the method including the steps of:

selecting a motor power draw characteristic that changes when an electric jack reaches a stroke limit;

determining a range of values for that characteristic that are consistent with the reaching of a stroke limit;

retrievably storing that range of values;

monitoring motor power draw for the selected power draw characteristic;

comparing monitored power draw values for the selected characteristic with the stored range of values for that characteristic; and recognizing that the jack has reached a stroke limit whenever the measured power draw characteristic falls within the stored range of values, the motor power draw characteristic being any one or more characteristics selected from the group consisting of:

the magnitude of motor current draw, the slope of the power curve of the jack motor, and the jack motor power waveform pattern.

* * * * *

UNITED STATES PATENT AND TRADEMARK OFFICE

CERTIFICATE OF CORRECTION

PATENT NO. : 7,199,534 B2
APPLICATION NO. : 11/223689
DATED : April 3, 2007
INVENTOR(S) : Robert M. Ford et al.

It is certified that error appears in the above-identified patent and that said Letters Patent is hereby corrected as shown below:

Column 2, line 28, “jacks a jack” should read --a jack--

Column 2, line 30, “sensors sense” should read --sensors to sense--

Column 12, line 53, delete “poll”, insert --pool--

Column 13, line 12, delete “Freq clutch-in” insert --Freq clutch-lo--

Signed and Sealed this

Seventeenth Day of June, 2008

JON W. DUDAS
*Director of the United States Patent and Trademark Office*